(12) United States Patent
Heule

(10) Patent No.: US 8,292,554 B2
(45) Date of Patent: Oct. 23, 2012

(54) DEVICE FOR DEBURRING SMALL-SIZED BORE DIAMETERS

(75) Inventor: Heinrich Heule, Au (CH)

(73) Assignee: Ulf Heule, Balgach (CH)

( * ) Notice: Subject to any disclaimer, the term of this patent is extended or adjusted under 35 U.S.C. 154(b) by 688 days.

(21) Appl. No.: 11/719,187

(22) PCT Filed: Nov. 2, 2005

(86) PCT No.: PCT/EP2005/011676
§ 371 (c)(1),
(2), (4) Date: May 22, 2009

(87) PCT Pub. No.: WO2006/050841
PCT Pub. Date: May 18, 2006

(65) Prior Publication Data
US 2010/0003095 A1    Jan. 7, 2010

(30) Foreign Application Priority Data
Nov. 13, 2004    (DE) .......................... 10 2004 054 989

(51) Int. Cl.
*B23B 51/08*    (2006.01)
(52) U.S. Cl. ......... 408/158; 408/199; 408/211; 408/713
(58) Field of Classification Search .................. 408/147, 408/153, 158, 199, 211, 713; *B23B 51/08*
See application file for complete search history.

(56) References Cited

U.S. PATENT DOCUMENTS

| | | | |
|---|---|---|---|
| 4,690,594 A * | 9/1987 | Kato | 408/159 |
| 5,181,810 A * | 1/1993 | Heule | 408/147 |
| 5,209,617 A | 5/1993 | Heule | |
| 5,803,679 A | 9/1998 | Heule | |
| 6,033,160 A * | 3/2000 | Heule et al. | 408/178 |
| 7,172,373 B2 * | 2/2007 | Heule | 408/156 |
| 2004/0101378 A1 | 5/2004 | Wiles | |
| 2005/0043131 A1 * | 2/2005 | Asbeck et al. | 474/135 |

FOREIGN PATENT DOCUMENTS
DE         4103190 A1 *    8/1992
(Continued)

OTHER PUBLICATIONS

PCT/EP2005/011676 International Search Report, Feb. 2006.

(Continued)

*Primary Examiner* — Eric A Gates
(74) *Attorney, Agent, or Firm* — Wood, Herron & Evans, LLP

(57) ABSTRACT

Device for deburring bore edges comprising a base body in which at least one recess transversally oriented relative to the longitudinal axis thereof is formed, at least one spring-loaded blade is slidingly displaceable in a longitudinal direction of the recess and a compression spring is disposed in the base body longitudinal bore and is supported by an end of a control bolt whose other end is engaged in a control recess formed in the blade for providing it with a retaining force in a displacement direction. The invention is characterized in that the base body for deburring the bores of a diameter<20 mm, comprises on the front thereof a smaller-diameter guide sleeve which is provided with a longitudinal bore formed therein forming a sliding guide element for guiding the control bolt tip sliding in said bore.

8 Claims, 2 Drawing Sheets

FOREIGN PATENT DOCUMENTS

| | | |
|---|---|---|
| EP | 0232750 | 8/1987 |
| EP | 0850119 | 7/1998 |
| EP | 1075888 A1 * | 2/2001 |
| JP | 06008044 A * | 1/1994 |
| WO | 98/01251 | 1/1998 |

OTHER PUBLICATIONS

PCT/EP2005/011676 Written Opinion, Feb. 2006.
German Search Report for Application No. 10 2004 054 989.3 dated Oct. 18, 2005, 4 pages.

* cited by examiner

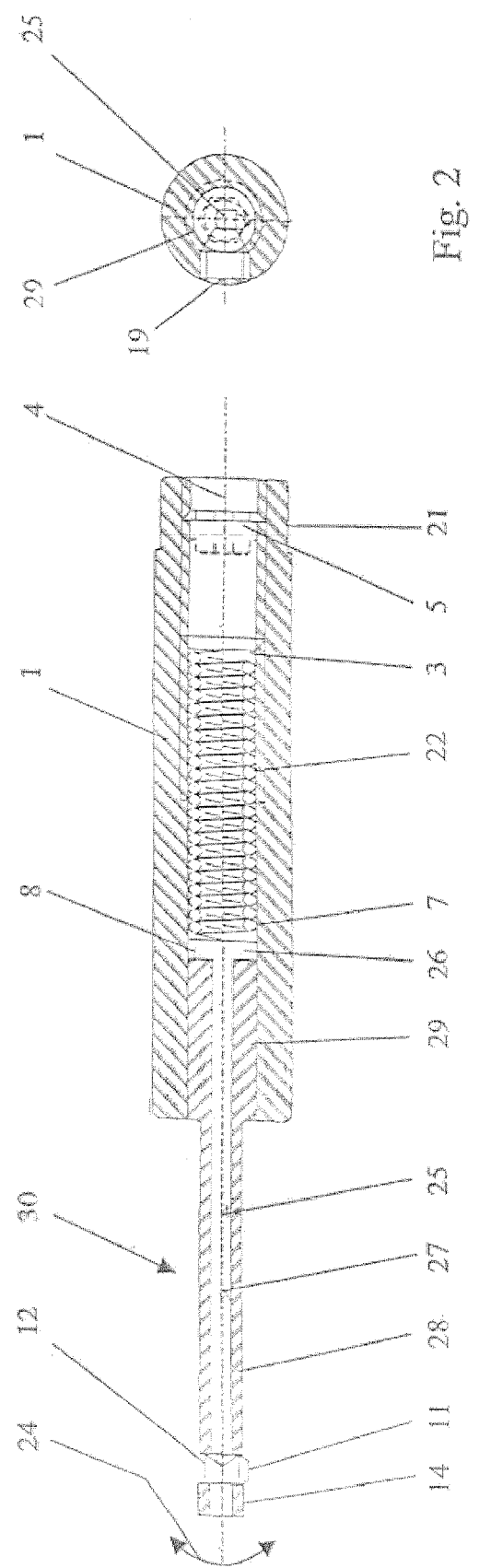

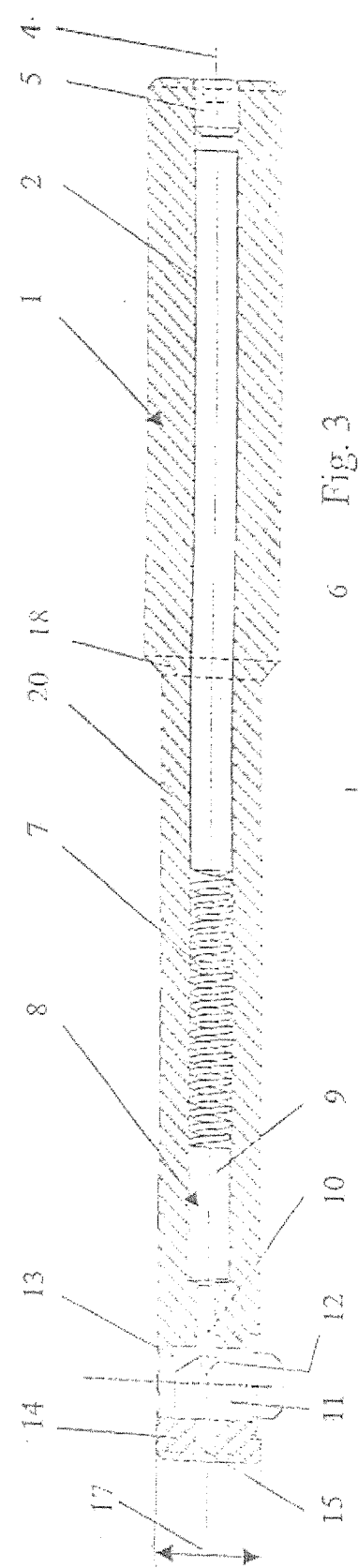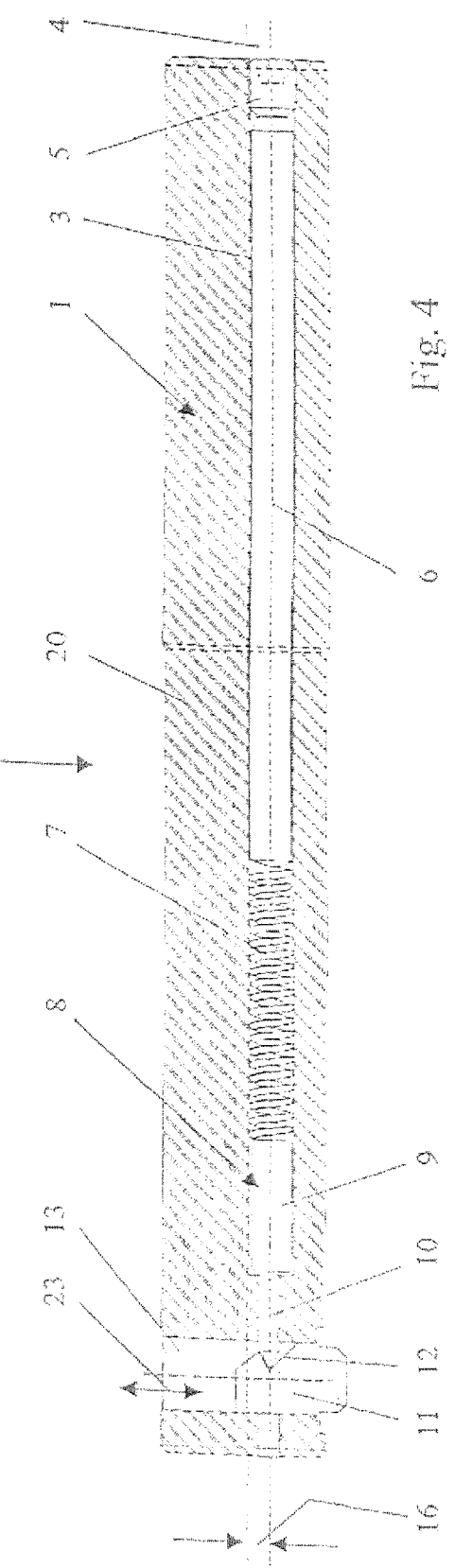

DEVICE FOR DEBURRING SMALL-SIZED BORE DIAMETERS

The invention relates to a device for deburring small-sized bore diameters.

A device for deburring bore edges is known from EP 0 850 119 B1 which involves the same inventor and is suitable for larger bore diameters. However, it has been found that a further minimisation of the deburring device for the purpose of deburring small-sized bore diameters is impossible. Such a deburring device for deburring bore edges of, for example, a diameter of 20 mm or less is required in oral surgery, surgery, microelectronics and miniature mechanical engineering, in particular. So far it has not been possible to reduce the size of the deburring device according to the device of EP 0 850 119 B1 enough to deburr the said smaller-sized bore diameters.

The reason for this was that in the case of a corresponding size reduction, the base body has to be formed with such a small diameter that the elements disposed in the central longitudinal bore of the base body (compression spring, control bolt, shaft) have to be so greatly minimised that their strength is no longer adequate.

The object of the invention is therefore to further develop a device of the aforementioned kind for deburring such that it is suitable for deburring bore diameters of less than 20 mm.

To resolve the problem in question, a device for deburrinq bore edges characterized by the technical teachings of the present invention is provided.

An essential feature of the invention is that now the base body is not provided with a relatively constant diameter right along up to the blade, but that the base body is stepped and that at the front of the base body a receiving opening is created into which a guide sleeve of smaller diameter is inserted wherein a longitudinal bore is formed which serves as a sliding guide element for the bolt tip of the control bolt supported therein so as to be slidingly displaceable.

With the idea of dividing the base body in two, namely into a rear portion of the base body which has a relatively large diameter and a guide sleeve with a greatly reduced diameter, which is arranged exchangeably at the front of the base body, there is now the advantage that even very small bore edges can be perfectly deburred.

Accordingly the diameter of the guide sleeve, which is arranged exchangeably in the longitudinal bore of the base body, is reduced considerably in size. High mechanical bending strength and torsional stability are nonetheless achieved because the longitudinal bore disposed in the guide sleeve is provided as a sliding guide element for the control bolt guided displaceably therein. The control bolt thus engages into this longitudinal bore with a pin-type continuation in the very greatly diameter-reduced longitudinal bore in the guide sleeve, where it acts as a stabilisation means against bending.

The control bolt therefore counteracts outward bends or even a break in the guide sleeve, because it supports the guide sleeve from within so that the entire device—in relation to the guide sleeve, the control bolt guided in the guide sleeve and the deburring blade arranged at the front end of the guide sleeve—can be substantially reduced in diameter.

It is thus possible for the first time to achieve a diameter of the guide sleeve of, for example, 2 mm wherein the length of the guide sleeve is about 23 mm and the length of the base body formed with a larger diameter is 40 mm.

The base body herein has, for example, a diameter of 8 mm and the entire device is accordingly 65 mm long.

Such a device can be used for the aforementioned miniaturised applications without fearing a break in the guide sleeve because it is supported from inside by the control bolt guided displaceably therein.

According to a further feature of the invention, the guide sleeve is held exchangeably in the longitudinal bore of the base body and has a guide collar of enlarged diameter which engages into the enlarged-diameter longitudinal bore of the base body and is held there by, for example, a locking screw.

In another configuration it is possible to provide the guide collar of the guide sleeve with an external thread and to arrange an internal thread in the longitudinal bore of the base body in order to interlink the two parts by means of a screwed connection.

The arrangement of an exchangeable guide sleeve has the advantage that the production of such a deburring device is now substantially less expensive because it is bipartite in design and the guide sleeve in its front region can be provided with a very thin diameter.

In a further embodiment it is envisaged that the guide sleeve is inserted centrally to the central longitudinal bore of the base body, but that in the interior of the guide sleeve a longitudinal bore is disposed eccentrically to the longitudinal central bore of the base body, the control bolt being guided displaceably within said longitudinal bore.

For this purpose the blade must always protrude with its cutting edges equally far from the opening of the transverse recess in the front region of the guide sleeve. If a blade holder of larger diameter is now used, and if it is intended to be used with the same blade, it is then sufficient to slide in this blade at the same location and the eccentric, spring-loaded control bolt will now engage again into the same location in the blade so that said blade always protrudes equally far from the knife holder regardless of the diameter of the blade holder.

If, therefore, the diameter of the one tool is enlarged by 10 mm more than the other, then the eccentricity of the eccentric longitudinal central bore will also be displaced 5 mm outwards in order again to ensure that the same blade protrudes equally far from the blade holder—which is now larger in diameter—and carries out an identical cutting action.

This provides the advantage that one and the same blade can be used to a certain extent for different diameters of tool holders and that by this means the need to stock blades can be greatly minimised.

It is also conceivable that the base body bore is eccentric in design and the bore of the guide sleeve is at its centre. Now the two parts are assembled and the same eccentricity arises as described above.

Because of the other functions of the deburring device, reference is made to the disclosure in EP 0 850 119 B1. This disclosure is to be incorporated in full by the disclosure describing the present invention.

The object of the present invention results not only from the subject matter of the individual claims, but also from the combination of the individual claims with each other.

All information and features disclosed in the documents, including the abstract, in particular the spatial construction shown in the drawings, are claimed as essential to the invention where they are novel compared with the prior art individually or in combination.

The invention is described in more detail below by reference to drawings which represent a plurality of ways of carrying out the invention. Further features essential to the invention and advantages are explained by the drawings and their descriptions.

The drawings show as follows:

FIG. 1: Section through a deburring device in a first embodiment

FIG. 2: Section according to line A-A in FIG. 1

FIG. 3: Section through a deburring device in a second embodiment with centrally located central bore FIG. 4: Section through a deburring device according to FIG. 3 with eccentrically located central bore for the guide sleeve The base body of a deburring device is presented in FIG. 1, which is also referred to as the blade holder. In the base body 1 a central, continuous longitudinal bore 3 is arranged whose rear portion is provided with an internal thread 22. In the longitudinal bore 3 a compression spring 7 is inserted and supported at its rear on a set screw which can be screwed into the internal thread 22 by means of a suitable tool.

Through the positioning of the set screw 5, the spring force of the compression spring 7 can therefore be adjusted.

Centrally to the central axis 4 of the longitudinal bore 3 a guide sleeve 30 is provided in the front region which consists of a stepped portion.

The guide collar 29 with a larger diameter is fitted into the longitudinal bore 3 and is fastened there according to FIG. 2 by means of a locking screw 19.

The guide collar 29 with a larger diameter is transformed at its front into a guide neck 28 of reduced diameter with, for example, a diameter of only 2 mm.

In the guide neck 28 a very small longitudinal bore 27 is provided in whose region the bolt tip 25 of a control bolt 8 is guided displaceably. The bolt tip 25 engages through the guide collar 29 at its rear end and is connected there to a pressure piece 26 with a larger diameter, which is displaceably accommodated in the longitudinal bore 3. The other end of the compression spring 7 is supported on this pressure piece 26.

The bolt tip 25 of the control bolt 8 engages in an associated control recess 12 at the blade 11 disposed in the front portion, which blade 11 is held displaceably, in a transverse recess 13 (see FIGS. 3 and 4), in a direction of displacement 23 (see FIG. 4), at the front end of the guide sleeve 30.

If correspondingly the guide sleeve 30 is subjected to bending stress, for example in the directions of arrow 24, the bolt tip 25 supports the guide sleeve 30 in the longitudinal bore 27 and prevents it from breaking.

The guide sleeve 30 is moreover easily replaceable in the base body 1 with the aforementioned locking screw 19.

At the rear end of the base body 1 there is moreover a threaded shoulder 21 embodied in the form of an external thread, so that the entire base body 1 can also be screwed onto another suitable holding tool.

Further details are shown by FIGS. 3 and 4.

The same reference numerals apply for the same parts, as was explained by reference to FIGS. 1 and 2.

By contrast to the embodiment according to FIG. 4, a push rod 6 acts on the right-hand end of the compression spring 7, said push rod 6 being capable of adjustment at its rear free end with the set screw 5.

The control bolt 8 is relatively short in design and consists of the bolt portions 9 with enlarged diameter with the one thereby relatively short bolt tip 10 continuing forwards whose free front end engages into the control recess 12 of the blade 11.

In this embodiment the longitudinal bore 2 is provided coaxially to the central longitudinal axis of the control bolt 8.

In the embodiment according to FIG. 4, however, the longitudinal bore 3 is provided eccentrically around the eccentric offset 16 to the central longitudinal axis 4. This results in the bolt tip 10, with constant outer diameter of the guide sleeve 20, engaging at a location offset downwards by the eccentric offset 16 into the control recess 12 of the blade 11.

The blade is thus displaceably held in the directions of displacement 23 in the transverse recess 13 and has a relatively large displacement path.

The same blade as in FIG. 3 can thus be used for a device according to FIG. 4 for a larger deburring diameter.

The diameter 17 of the guide sleeve in the embodiment according to FIG. 3 can, for example, be 7.8 mm, whilst the diameter 17 according to FIG. 4 can be around 11.6 mm.

In the embodiment according to FIG. 3 it is also shown that the base body 1 forms a shoulder 18 in order thereby to be transformed into a guide sleeve 20 of greatly reduced diameter.

In the practical example shown, the guide sleeve 20 is, however, not provided exchangeably, as shown—by contrast—in FIG. 1.

LEGEND

1. Base body
2. Longitudinal bore
3. Longitudinal bore
4. Central axis
5. Set screw
6. Push rod
7. Compression spring
8. Control bolt
9. Bolt portion
10. Bolt tip
11. Blade
12. Control recess
13. Transverse recess
14. Front portion
15. Bore
16. Eccentric offset
17. Diameter
18. Shoulder
19. Locking screw
20. Guide sleeve
21. Threaded shoulder
22. Internal thread
23. Direction of displacement
24. Arrow directions
25. Bolt tip
26. Pressure piece
27. Longitudinal bore
28. Guide neck
29. Guide collar
30. Guide sleeve

The invention claimed is:

1. A device for deburring bore edges of a bore having a diameter<20 mm, said device comprising:

a base body having a central longitudinal axis, a longitudinal bore, a front end, and a rear end adapted to be mounted in a chuck, a guide sleeve having a longitudinal bore, a rear portion, a front portion, and a front end, said rear portion of said guide sleeve comprising a guide collar of a larger diameter received in said longitudinal bore of said base body, said front portion of said guide sleeve comprising a guide neck of a smaller diameter, said front end of said guide sleeve having a recess oriented transversely to said central longitudinal axis of said base body, a blade received in said recess of said guide sleeve for slideable displacement therein and having a control recess therein, a control bolt received in said longitudinal bore of said guide sleeve for slideable displacement therein, said control bolt having a pressure piece on a rear end thereof and external to said guide sleeve and a bolt tip on a front end thereof, said bolt tip engaged in said control recess of said blade, and a compression spring disposed in said longitudinal bore of said base body and having a front end abutting said pressure piece and a rear end supported against movement toward said rear end of said base body, said compression spring biasing said bolt tip of said control bolt in said control recess of said blade thereby providing a biasing force against movement of said blade in said recess.

2. The device of claim 1 wherein said longitudinal bore of said guide sleeve is coaxial with said central longitudinal axis of said base body.

3. The device of claim 1 wherein said longitudinal bore of said guide sleeve is eccentric to said central longitudinal axis of said base body.

4. The device of claim 1 wherein said compression spring is a helical compression spring.

5. The device of claim 1 wherein said compression spring is a leg spring.

6. The device of claim 1 wherein said compression spring is a flat spiral spring.

7. The device of claim 1 wherein said control recess in said blade comprises a root from which first and second straight lines extend obliquely relative to a mid-line of said control bolt, and wherein said second straight line has a flatter incline than said first straight line.

8. The device of claim 7 wherein said root is laterally offset from said mid-line of said control bolt in said control recess.

\* \* \* \* \*